United States Patent
Osaka et al.

(10) Patent No.: US 9,064,520 B2
(45) Date of Patent: Jun. 23, 2015

(54) MAGNETIC RECORDING MEDIUM AND METHOD OF MANUFACTURING THE SAME, AND MAGNETIC RECORD/REPRODUCTION APPARATUS

(75) Inventors: Tetsuya Osaka, Tokyo (JP); Atsushi Sugiyama, Kawaguchi (JP); Takuma Hachisu, Ichihara (JP); Tomoo Shige, Chiba (JP); Masato Fukushima, Chiba (JP); Akira Yamane, Ichihara (JP); Akira Sakawaki, Ichihara (JP)

(73) Assignees: SHOWA DENKO K.K., Tokyo (JP); WASEDA UNIVERSITY, Tokyo (JP)

( * ) Notice: Subject to any disclaimer, the term of this patent is extended or adjusted under 35 U.S.C. 154(b) by 0 days.

(21) Appl. No.: 13/478,739

(22) Filed: May 23, 2012

(65) Prior Publication Data
US 2012/0300339 A1 Nov. 29, 2012

(30) Foreign Application Priority Data
May 24, 2011 (JP) ................................. 2011-116149

(51) Int. Cl.
| G11B 5/706 | (2006.01) |
| G11B 5/82 | (2006.01) |
| G11B 5/73 | (2006.01) |
| G11B 5/66 | (2006.01) |
| G11B 5/65 | (2006.01) |
| G11B 5/84 | (2006.01) |

(52) U.S. Cl.
CPC ............... *G11B 5/7325* (2013.01); *G11B 5/66* (2013.01); *G11B 5/656* (2013.01); *G11B 5/8404* (2013.01)

(58) Field of Classification Search
CPC ...... G11B 5/7325; G11B 5/8404; G11B 5/66; G11B 5/656; G11B 5/82
USPC ..................... 360/131, 135; 428/848.2–848.4
See application file for complete search history.

(56) References Cited

U.S. PATENT DOCUMENTS

| 5,750,230 | A  | * | 5/1998 | Ishikawa et al. ........... 428/848.2 |
| 7,255,943 | B2 | * | 8/2007 | Miyamoto et al. ......... 428/848.2 |
| 7,470,476 | B2 | * | 12/2008 | Ishii et al. .................. 428/846.9 |
| 2002/0132083 | A1 | * | 9/2002 | Weller et al. ................. 428/65.3 |
| 2004/0229006 | A1 | * | 11/2004 | Momose et al. ............. 428/65.3 |
| 2006/0099462 | A1 | * | 5/2006 | Ahner et al. .................. 428/836 |
| 2006/0177705 | A1 | * | 8/2006 | Ahner et al. .................. 428/832 |
| 2009/0136785 | A1 | * | 5/2009 | Chen ............................ 428/846 |
| 2011/0075288 | A1 | * | 3/2011 | Krichevsky et al. ............ 360/31 |

FOREIGN PATENT DOCUMENTS

| JP | 8-212531 A | 8/1996 |
| JP | 2004-227745 A | 8/2004 |
| JP | 2006-19000 A | 1/2006 |

(Continued)

*Primary Examiner* — Adam B Dravininkas
(74) *Attorney, Agent, or Firm* — Sughrue Mion, PLLC

(57) ABSTRACT

According to the present invention, a magnetic recording medium is provided including a disk-shaped non-magnetic substrate and at least a perpendicular magnetic layer formed on the disk-shaped non-magnetic substrate, wherein the perpendicular magnetic layer has a structure in which an FePt or CoPt nanoparticle array is formed on a formation surface, on which a plurality of striations each having a circumferential directional component are formed, by a texturing treatment; a manufacturing method thereof; and a magnetic record/reproduction apparatus including the magnetic recording medium or a magnetic recording medium manufactured according to the manufacturing method.

6 Claims, 5 Drawing Sheets

(56) References Cited

FOREIGN PATENT DOCUMENTS

| | | | |
|---|---|---|---|
| JP | 2006-268984 A | 10/2006 | |
| JP | 2007-272990 A | 10/2007 | |
| JP | 2009-035769 A | 2/2009 | |
| WO | 2008/059562 A1 | 5/2008 | |

* cited by examiner

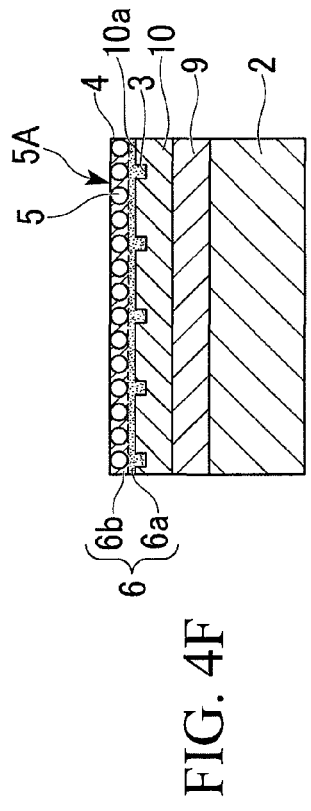
FIG. 4A
FIG. 4B
FIG. 4C
FIG. 4D
FIG. 4E
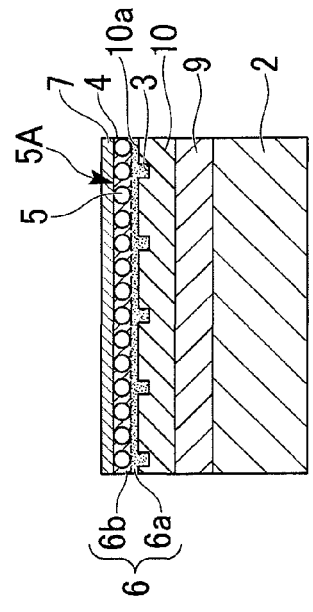
FIG. 4F
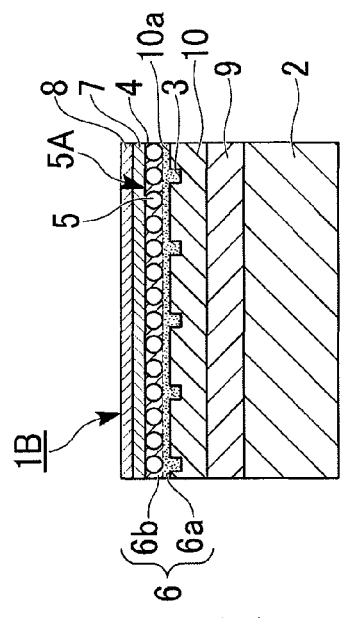
FIG. 4G
FIG. 4H

MAGNETIC RECORDING MEDIUM AND METHOD OF MANUFACTURING THE SAME, AND MAGNETIC RECORD/REPRODUCTION APPARATUS

BACKGROUND OF THE INVENTION

1. Field of the Invention

The present invention relates to a magnetic recording medium used for a hard disk drive (HDD) and the like and a method of manufacturing a magnetic recording medium, and to a magnetic record/reproduction apparatus including the magnetic recording medium or a magnetic recording medium manufactured according to the manufacturing method.

This application Claims priority on Japanese Patent Application No. 2011-116149 filed on May 24, 2011, the disclosure of which is incorporated by reference herein.

2. Background Art

The perpendicular magnetic recording medium, the magnetic easy axis of which is oriented in the perpendicular direction of a medium is a suitable system to increase magnetic areal density than the system of the traditional longitudinal recording medium. The demagnetizing field decreases the thermal stability of recorded magnetization in medium; however, the demagnetizing field in the perpendicular magnetic recording medium is decreased with increasing the magnetic areal density, i.e., the perpendicular magnetic recording is recognized by researchers and engineers as the prime candidate system to realize a high area recording density over 1 tera bit per a square inch.

A perpendicular magnetic recording medium is obtained by sequentially stacking a soft magnetic underlayer, an underlayer, an intermediate layer and a perpendicular magnetic recording layer, each of which are formed of a thin film, on a disk-shaped non-magnetic substrate. In the case where the soft magnetic underlayer made of a soft magnetic material is provided between the disk-shaped non-magnetic substrate and the perpendicular magnetic recording layer, this function as a so-called double layer perpendicular magnetic recording medium, which can achieve high recording performance. The soft magnetic soft magnetic underlayer serves to reflux a recording magnetic field which is generated from a magnetic head, thereby improving the record/reproduction efficiency.

The underlayer functions to determine the grain diameters and the crystal orientations of both the intermediate layer and the perpendicular magnetic recording layer provided on the intermediate layer. In the intermediate layer, a dome-shaped convex part is formed at the top of each crystal particle, and the magnetic crystal grains such as those of a recording layer are grown on the convex parts. Thereby, the separation of the grown crystal grains promotes the isolating of the magnetic crystal grains in the recording layer, and the magnetic grains are grown in the form of columns (refer to Japanese Unexamined Patent Application, First Publication No. 2007-272990).

According to another method of manufacturing a magnetic recording medium, FePt nanoparticles are used (refer to Japanese Unexamined Patent Application, First Publication No. 2009-035769). According to this method, an FePt magnetic nanoparticle array in which the FePt nanoparticles are arranged on a substrate by coating or the like is used in the magnetic recording medium. This recording medium is superior to the current magnetic recording medium using continuous thin films due to weakening of magnetic coupling between magnetic grains.

Specifically, Japanese Unexamined Patent Application, First Publication No. 2009-035769 discloses a method of forming a mono-layer film of FePt nanoparticles by bonding a dispersant to the FePt nanoparticles and chemically bonding the dispersant to a surface of the substrate or chemically bonding the dispersant to another dispersant chemically bound to the surface of the substrate.

PRIOR ART LITERATURE

Patent Documents

Patent document 1: Japanese Unexamined Patent Application, First Publication No. 2007-272990

Patent document 2: Japanese Unexamined Patent Application, First Publication No. 2009-035769

In order to realize the magnetic recording medium using the above-mentioned FePt magnetic nanoparticle array as a perpendicular magnetic layer, it is essential to establish a technology that uniformly arranges the FePt nanoparticles with a uniform shape, with uniform particle diameter and uniform magnetic properties on the substrate, such that their easy axes are perpendicularly oriented.

However, when the FePt nanoparticles were uniformly arranged on the substrate such that the easy axes were perpendicularly oriented according to the method disclosed in Japanese Unexamined Patent Application, First Publication No. 2009-035769, local disturbance was observed in the arrangement of the FePt nanoparticles. Further, investigation as to why this arrangement disturbance occurred revealed a minute flaw on the surface of the substrate where the disturbance occurred. It was found that the arrangement of the FePt nanoparticles was also disturbed, as a result of the arrangement of an organic coating agent being disturbed by this flaw.

SUMMARY OF THE INVENTION

The present invention is proposed in light of such conventional circumstances, and as an object thereof provides a magnetic recording medium in which FePt or CoPt nanoparticles having a uniform shape, uniform particle diameter and uniform magnetic properties can be uniformly arranged on a surface of a non-magnetic substrate such that their easy axes are perpendicularly oriented, a manufacturing method thereof, and a magnetic record/reproduction apparatus including the magnetic recording medium or a magnetic recording medium manufactured according to the manufacturing method.

The present inventors intensively studied so as to achieve the above object and found that the local disturbance of nanoparticles on a formation layer where a perpendicular magnetic layer is formed could be prevented by applying a texturing treatment on the formation surface of the non-magnetic substrate in a circumferential direction to form minute striations.

That is, the present invention provides the following means.

(1) A magnetic recording medium including a disk-shaped non-magnetic substrate and at least a perpendicular magnetic layer formed on the disk-shaped non-magnetic substrate, wherein the perpendicular magnetic layer has a structure in which an FePt or CoPt nanoparticle array is formed on a formation surface, on which a plurality of striations each having a circumferential directional component are formed, by a texturing treatment.

(2) The magnetic recording medium according to the above item (1), wherein the FePt or CoPt nanoparticle array is formed by dispersing a plurality of FePt or CoPt nanoparticles on an organic coating layer.

(3) The magnetic recording medium according to the above item (1) or (2), wherein the formation surface is a surface of the non-magnetic substrate.

(4) The magnetic recording medium according to the above item (1) or (2), wherein an underlayer and an intermediate layer are sequentially provided between the non-magnetic substrate and the perpendicular magnetic layer; and the formation surface is a surface of the intermediate layer.

(5) The magnetic recording medium according to any one of the above items 1 to 4, wherein an average particle diameter of the FePt or CoPt nanoparticles falls within a range of 3 to 5 nm.

(6) The magnetic recording medium according to any one of the above items (1) to (5), wherein a surface roughness of a formation surface subjected to the texturing treatment falls within a range of 0.15 to 1 nm in center line average roughness (Ra) and a distance between the adjacent striations is set to fall within a range of 10 to 20 nm.

(7) A method of manufacturing a magnetic recording medium including a disk-shaped non-magnetic substrate and at least a perpendicular magnetic layer formed on the disk-shaped non-magnetic substrate, the method including the steps of:

applying a texturing treatment to a formation surface, on which the perpendicular magnetic layer is formed, to form a plurality of striations each having a circumferential directional component on the formation surface; and bringing a dispersion of FePt or CoPt nanoparticles into contact with the formation surface subjected to the texturing treatment to form an FePt or CoPt nanoparticle array that serves as the perpendicular magnetic layer on the formation surface.

(8) The method of manufacturing a magnetic recording medium according to the above item (7), wherein the texturing treatment is applied to a surface of the non-magnetic substrate that serves as the formation surface.

(9) The method of manufacturing a magnetic recording medium according to the above item (7), further comprising the step of sequentially stacking an underlayer and an intermediate layer between the non-magnetic substrate and the perpendicular magnetic layer, wherein a texturing treatment is applied to a surface of the intermediate layer that serves as the formation surface.

(10) The method of manufacturing a magnetic recording medium according to any one of the above items (7) to (9), wherein an average particle diameter of the FePt or CoPt nanoparticles falls within a range of 3 to 5 nm.

(11) The method of manufacturing a magnetic recording medium according to any one of the above items (7) to (10), wherein a surface roughness of the non-magnetic substrate subjected to the texturing treatment is set to fall within a range of 0.15 to 1 nm in center line average roughness (Ra) and a distance between the adjacent striations is set to fall within a range of 10 to 20 nm.

(12) A magnetic record/reproduction apparatus including:

the magnetic recording medium according to any one of the above items (1) to (6) or a magnetic recording medium manufactured by the manufacturing method according to any one of the above items (7) to (11);

a medium driving unit that drives the magnetic recording medium in a recording direction;

a magnetic head that performs a recording operation and a reproduction operation relative to the magnetic recording medium;

head moving means configured to move the magnetic head relative to the magnetic recording medium; and a recording/reproduction signal processing means configured to input a signal to the magnetic head and reproduce an output signal from the magnetic head.

As described above, according to the present invention, it is possible to provide a magnetic recording medium in which the FePt or CoPt nanoparticles having a uniform shape, uniform particle diameter and uniform magnetic properties are uniformly arranged on the surface of the non-magnetic substrate such that their easy axes are perpendicularly oriented, and a manufacturing method thereof. Further, it is possible to provide a magnetic record/reproduction apparatus including the magnetic recording medium or a magnetic recording medium manufactured according to the manufacturing method.

BRIEF DESCRIPTION OF THE DRAWINGS

FIG. 4A is a sectional view illustrating one step of the manufacturing process in the magnetic recording medium shown in FIG. 3.

FIG. 4B is a sectional view illustrating one step of the manufacturing process in the magnetic recording medium shown in FIG. 3.

FIG. 4C is a sectional view illustrating one step of the manufacturing process in the magnetic recording medium shown in FIG. 3.

FIG. 4D is a sectional view illustrating one step of the manufacturing process in the magnetic recording medium shown in FIG. 3.

FIG. 4E is a sectional view illustrating one step of the manufacturing process in the magnetic recording medium shown in FIG. 3.

FIG. 4F is a sectional view illustrating one step of the manufacturing process in the magnetic recording medium shown in FIG. 3.

FIG. 4G is a sectional view illustrating one step of the manufacturing process in the magnetic recording medium shown in FIG. 3.

FIG. 4H is a sectional view illustrating one step of the manufacturing process in the magnetic recording medium shown in FIG. 3.

DETAILED DESCRIPTION OF THE INVENTION

Figure 1A:
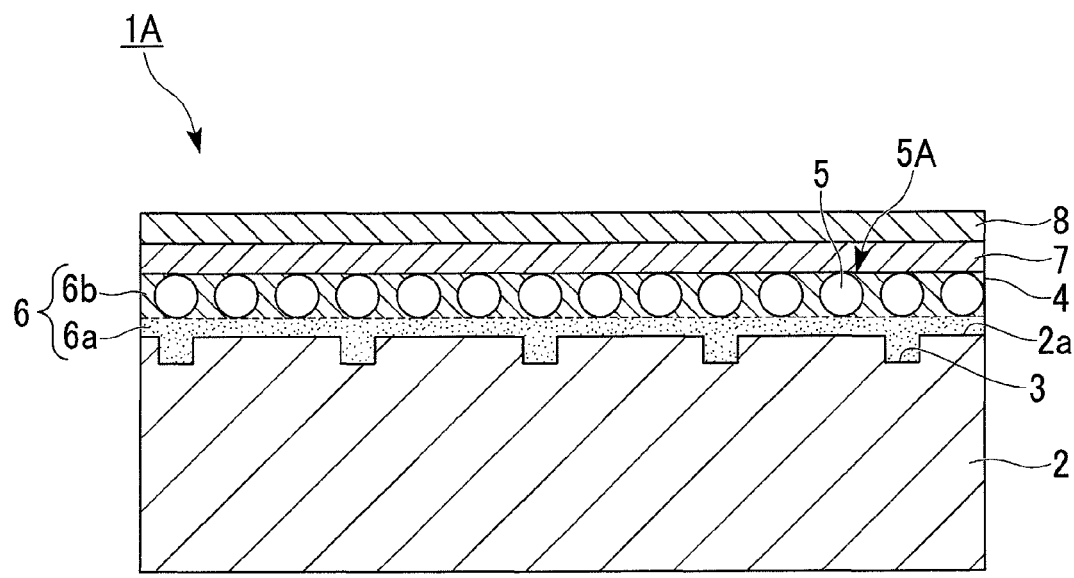
FIG. 1A is a sectional view showing a structure of a magnetic recording medium in the first embodiment.

A magnetic recording medium, a manufacturing method thereof, and a magnetic record/reproduction apparatus according to the present invention will be described below with reference to the accompanying drawings.

In the drawings used in the following description, for clarification of features, some characteristic sections may be enlarged, and dimension ratios of each constituent do not necessarily reflect the actual ones. Material, size, and so on, exemplified in the following description are only examples, and the present invention is not limited thereto and may be appropriately modified and implemented within the scope of the present invention.

[First Embodiment]
(Magnetic Recording Medium)

Figure 1B:
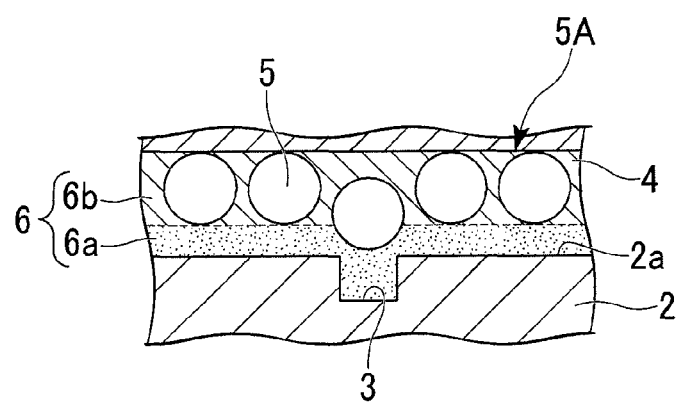
FIG. 1B is an enlarged sectional view of a main part of the magnetic recording medium in the first embodiment.

First, a magnetic recording medium 1A in the first embodiment of the present invention as shown in FIG. 1A and FIG. 1B will be described.

FIG. 1A is a sectional view showing a structure of the magnetic recording medium 1A, and FIG. 1B is an enlarged sectional view showing a main part of the magnetic recording medium 1A.

As shown in FIG. 1A, the magnetic recording medium 1A has a formation surface 2a, on which a plurality of striations 3 each having a circumferential directional component are formed, by applying texturing treatment on the surface 2a of a disk-shaped non-magnetic substrate 2 having a central hole. A FePt or CoPt nanoparticle array 5A that serves as a perpendicular magnetic layer 4 is formed on the formation surface 2a.

The nanoparticle array 5A is, as shown in FIG. 1B, formed by dispersing a plurality of nanoparticles 5 in an organic coating layer 6. Specifically, the nanoparticle array 5A can be formed by any generally known method. For example, by applying a solution of a dispersant 6a having a first functional group to the formation surface 2a subjected to the texturing treatment, and then applying a dispersion of the FePt or CoPt nanoparticles 5 coated with a dispersant 6b having a second functional group, the nanoparticle array 5A in which the plurality of nanoparticles 5 are dispersed can be formed in the organic coating layer 6 in which the first functional group and the second functional group are bonded to each other. Alternatively, by applying a dispersion of the FePt or CoPt nanoparticles 5 dispersed by a dispersant to the formation surface 2a subjected to the texturing treatment, the nanoparticle array 5A in which the plurality of nanoparticles 5 are dispersed can be formed.

It is preferable that the nanoparticle array 5A have a structure in which the FePt or CoPt nanoparticles 5 having a uniform shape, uniform particle diameter and uniform magnetic properties are uniformly arranged on the formation surface 2a such that their easy axes are perpendicularly oriented.

In order to form the nanoparticle array 5A having such a structure, it is preferable to set surface roughness of the formation surface 2a subjected to the texturing treatment to fall within a range of 0.15 to 1 nm in center line average roughness (Ra) and a distance between the adjacent striations 3 to fall within a range of 10 to 20 nm. Further, it is preferable to set an average particle diameter of the FePt or CoPt nanoparticles 5 to fall within a range of 3 to 5 nm.

In the magnetic recording medium 1A, as shown in FIG. 1A, a protective layer 7 and a lubricant layer 8 are stacked on the perpendicular magnetic layer 4 formed of the nanoparticle array 5 in this order.

The magnetic recording medium 1A having such structure can prevent local disturbance of the nanoparticles 5 on the formation surface 2a by applying a texturing treatment to the surface (formation surface) 2a of the non-magnetic substrate 2 in the circumferential direction to provide the minute striations 3. Therefore, according to the present invention, it is possible to obtain the magnetic recording medium 1A including the perpendicular magnetic layer 4 formed of the nanoparticle array 5A in which the FePt or CoPt nanoparticles 5 having a uniform shape, uniform particle diameter and uniform magnetic properties are uniformly arranged on the formation surface 2a such that their easy axes are perpendicularly oriented.

(Method of Manufacturing Magnetic Recording Medium)

Next, a method of manufacturing a magnetic recording medium 1A shown in FIG. 1A and FIG. 1B will be described with reference to FIG. 2A to FIG. 2F.

Figure 2A:
FIG. 2A is a sectional view illustrating one step of a manufacturing process in the magnetic recording medium shown in FIG. 1.

In manufacturing the magnetic recording medium 1A, first, as shown in FIG. 2A, the disk-shaped non-magnetic substrate 2 having a central hole is prepared.

It is preferable that a material for the non-magnetic substrate 2 can resist heating at temperatures of about 500 to 900° C. This is due to that, as described below, heating at 500° C. or higher is required to order a crystalline structure of the FePt or CoPt nanoparticles 5 into an $L1_0$ structure and increase magnetic anisotropy, and in the case of adopting the crystalline structure requiring such thermal treatment, the non-magnetic substrate 2 needs to resist it. It is possible to use, as the material for the non-magnetic substrate 2, for example, silicon, magnesium oxide, sapphire, alumina, silicon nitride, silicon carbide and the like.

Figure 2B:
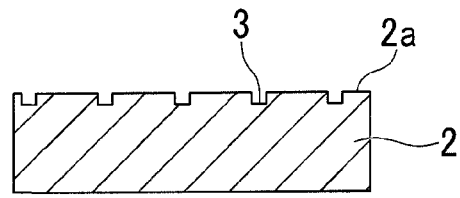
FIG. 2B is a sectional view illustrating one step of the manufacturing process in the magnetic recording medium shown in FIG. 1.

Next, as shown in FIG. 2B, by applying a texturing treatment to the surface (formation surface) 2a of the non-magnetic substrate 2, the plurality of striations 3 each having a circumferential directional component are formed (this process is referred to as a texture method).

In the texture method, a texturing treatment may be directly applied to the surface 2a of the non-magnetic substrate 2, or an underlayer such as a soft magnetic film may be formed on the surface of the non-magnetic substrate, and then texturing treatment may be applied to a surface of the underlayer.

In the texturing treatment, the plurality of striations 3 are formed on the surface 2a of the non-magnetic substrate 2 by pressing a texturing tape onto the surface 2a of the non-magnetic substrate 2 rotated at low speed while dripping a polishing solution containing diamond abrasive particles or alumina abrasive particles.

Examples of the polishing solution used at this time include an aqueous diamond slurry. Examples of the texturing tape include a polyester ultrafine fiber cloth. The number of rotations of the non-magnetic substrate 2 varies depending on its diameter. For example, in manufacturing the magnetic recording medium having a diameter of 1.89 to 3.5 inches, the number of rotations of the non-magnetic substrate 2 may be set to fall within a range of 150 to 800 rpm. When the number of rotations of the non-magnetic substrate 2 exceeds the range, the surface 2a of the non-magnetic substrate 2 may become rough, and when the number of rotations of the non-magnetic substrate 2 falls below the range, processing time is prolonged, which is undesirable.

A center line average surface roughness (Ra) of the non-magnetic substrate 2 subjected to the texture treatment preferably alls within a range of 0.15 to 1 nm (1.5 to 10 Å), and more preferably 0.2 to 0.5 nm (2.0 to 5 Å). When the surface roughness Ra of the non-magnetic substrate 2 is less than 0.15 nm (1.5 Å), the effect of the striations 3 subjected to the texturing treatment becomes insufficient, that is, the effect of uniformly arranging the FePt or CoPt nanoparticles as mentioned below becomes insufficient. On the other hand, when the surface roughness Ra of the non-magnetic substrate 2 exceeds 1 nm (10 Å), the surface roughness of the final magnetic recording medium 1A deteriorates and thus, a floating amount of a magnetic head cannot be made sufficiently small, which is undesirable.

In the surface 2a of the non-magnetic substrate 2 subjected to the texturing treatment, preferably, the distance between the adjacent striations 3 is set to fall within a range of 10 to 20 nm. Since the average particle diameter of the FePt or CoPt nanoparticles is 3 to 5 nm, by setting the distance between the adjacent striations 3 to be in this range, the FePt or CoPt nanoparticles can be uniformly arranged on the surface 2a of the non-magnetic substrate 2.

The distance between the adjacent striations 3 formed on the surface 2a of the non-magnetic substrate 2 depends on the type, particle diameter, concentration and amount of the abrasive particles contained in the polishing solution, the material for the texturing tape, fiber density, pressing load and the number of rotations of the substrate. Accordingly, the distance between the adjacent striations 3 formed on the surface 2a of the non-magnetic substrate 2 can be adjusted by appropriately selecting these conditions. The surface roughness (Ra) of the non-magnetic substrate 2 and the distance between the adjacent striations 3 can be measured by use of an AFM.

Next, by bringing the surface 2a of the non-magnetic substrate 2 subjected to the texturing treatment into contact with the dispersion of the FePt or CoPt nanoparticles 5, the FePt or CoPt nanoparticle array 5A that serves as the perpendicular magnetic layer 4 is formed.

Figure 2C:
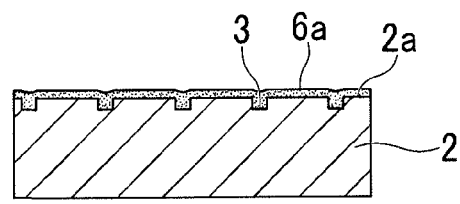
FIG. 2C is a sectional view illustrating one step of the manufacturing process in the magnetic recording medium shown in FIG. 1.

Specifically, first, as shown in FIG. 2C, a solution of the dispersant 6a having the first functional group is brought into contact with the surface 2a of the non-magnetic substrate 2 subjected to the texturing treatment (this step is referred to as first contact step).

In the first contact step, it is preferable that an organic substance having the first functional group that is likely to bond with a below-mentioned second functional group and is less likely to bond with the surface 2a of the non-magnetic substrate 2 at one end of its molecular chain, and a third functional group that is likely to bond with the surface 2a of the non-magnetic substrate 2 and is less likely to bond with the second functional group at the other end of its molecular chain be used as the dispersant 6a having the first functional group. Thereby, molecules of the dispersant are chemically bonded to the surface 2a of the non-magnetic substrate 2 through the third functional group to form a monomolecular film of the dispersant 6a having the first functional group on the surface of the non-magnetic substrate 2.

Among the first and third functional groups having such characteristics, examples of the first functional group include a thiol group and an amino group, and examples of the third functional group include a methoxysilanyl group, an alkoxysilanyl group such as an ethoxysilanyl group, a silanol group and a hydroxyl group, and they can be appropriately selected and used. Examples of the dispersant 6a having the first and third functional groups include 3-mercaptotriethoxysilane.

Such solution of the dispersant 6a can be brought into contact with the surface 2a of the non-magnetic substrate 2 by any conventionally known method. For example, it is possible to use a method of dissolving the dispersant 6a in a solvent such as toluene, immersing the non-magnetic substrate 2 into this solution and heating the non-magnetic substrate 2 at 50 to 70° C. for 1 to 20 minutes. Alternatively, it is possible to use a method of applying the above-mentioned solution to the non-magnetic substrate 2 by spin coating or the like and holding the non-magnetic substrate 2 in the same time as the above-mentioned immersion time.

Figure 2D:
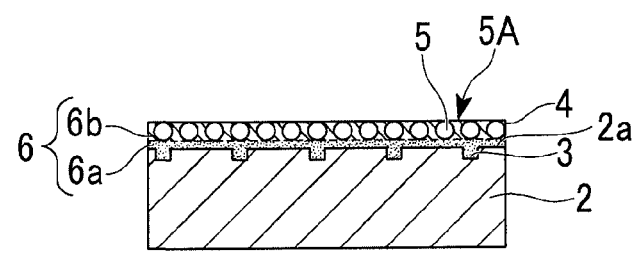
FIG. 2D is a sectional view illustrating one step of the manufacturing process in the magnetic recording medium shown in FIG. 1.

Next, as shown in FIG. 2D, a dispersion of the FePt or CoPt nanoparticles 5 coated with the dispersant 6b having the second functional group is brought into contact with the surface 2a of the non-magnetic substrate 2 in contact with the dispersant 6a having the first functional group (this step is referred to as a second contact step).

In the second contact step, by bringing the dispersion of the FePt or CoPt nanoparticles 5 coated with the dispersant 6b having the second functional group into contact with the surface 2a of the non-magnetic substrate 2 on which the monomolecular film of the dispersant 6a having the first functional group, the first functional group and the second functional group are chemically bonded to each other. Thereby, it is possible to form the FePt or CoPt magnetic nanoparticle array 5A in which the plurality of FePt or CoPt nanoparticles 5 are uniformly arranged on the formation surface 2a of the non-magnetic substrate 2 subjected to the texturing treatment.

It is preferable that an organic substance having the second functional group that is likely to bond with the first functional group and is less likely to bond with the FePt or CoPt nanoparticles 5 at one end of its molecular chain, and a fourth functional group that is less likely to bond with the first functional group and is likely to bond with the FePt or CoPt nanoparticles 5 at the other end of its molecular chain be used as the dispersant 6b used in the second contact step. Thereby, molecules of the coating agent are chemically bonded to the surface of the nanoparticles 5 through the fourth functional group to form a monomolecular film of the dispersant 6b on the surface of the nanoparticles 5 and to coat the surface with the second functional group.

Among the second and fourth functional groups, examples of the second functional group include a thiol group, and examples of the fourth functional group include a thiol group, an amino group and a cyano group. They can be appropriately selected and used.

Examples of the dispersant 6b having the second functional group and the fourth functional group include 1,6-hexanedithiol, 1,9-nonanedithiol and 1,10-decanedithiol.

The FePt or CoPt nanoparticles 5 can be coated with the dispersant 6b having the second functional group according to any conventionally known method. For example, the dispersant 6b may be dissolved in a solvent of toluene, hexane or the like, and then the FePt or CoPt nanoparticles 5 may be immersed in this solvent at 20 to 60° C. for 1 to 20 minutes.

The dispersion of the FePt or CoPt nanoparticles 5 coated with the dispersant 6b having the second functional group can be brought into contact with the surface 2a of the non-magnetic substrate 2 according to any conventionally known method. For example, a method of immersing the non-magnetic substrate 2 into the dispersion and a method of applying the dispersion to the surface 2a of the non-magnetic substrate 2 by spin coating can be adopted.

The FePt nanoparticles used in the second contact step can be produced according to any conventionally known method. In a specific example of the method of manufacturing FePt nanoparticles, first, a mixed solution of a Pt compound and a reducing agent is reacted to generate particles of a metal Pt core in the solution by a reduction reaction of the Pt compound. Examples of the Pt compound used at this time include Pt acetylacetonate and Pt ethoxide ($Pt(OEt)_2$). Examples of the reducing agent include unsaturated hydrocarbon of 16 to 18 carbon atoms such as 1-octadecene (preferably linear unsaturated hydrocarbon, and preferably unsaturated hydrocarbon having a double bond at one end) and saturated hydrocarbon diol of 16 to 18 carbon atoms such as 1,2-hexadecane diol (preferably hydrocarbon diol in which a saturated hydrocarbon group is a linear group, and preferably hydrocarbon diol having a hydroxyl group at the 1- and 2-positions). During this reduction reaction, it is preferable to add a dispersant for uniformly dispersing the Pt nuclear particles to the mixed solution, and examples of the dispersant include linear unsaturated fatty acids of 3 to 17 carbon atoms such as oleic acid, oleylamine, and N-2-vinylpyrrolidone.

Next, an Fe compound is added to the solution in which the particles of a metal Pt core are dispersed, and then metal Fe is deposited from the above solution on the surface of the particles of a metal Pt core. Examples of the Fe compound include iron pentacarbonyl, iron acetylacetonate and iron ethoxide.

Next, nanoparticles containing Fe generated from the deposited metal Fe and Pt are heated in a reaction solution to about 200° C. to 300° C. Thereby, FePt nanoparticles in which Pt atoms and Fe atoms are interdiffused are formed. After that, by separating the FePt nanoparticles from the solution and performing wet classification in separation, FePt nanoparticles having more uniform particle diameter can be obtained.

It is preferable that the average particle diameter of the FePt nanoparticles be set to fall within a range of 3 to 5 nm. Thereby, the FePt nanoparticles can be uniformly arranged on the surface of the non-magnetic substrate subjected to the texturing treatment in the circumferential direction. The average particle diameter of the FePt nanoparticles can be calculated based on an image of Transmission Electron Microscope (TEM).

By dispersing the FePt nanoparticles on the surface of the substrate, and then performing thermal treatment in an inert gas atmosphere, such as argon gas, at 500° C. for 30 minutes while perpendicularly applying an external magnetic field to the surface of the substrate, the FePt nanoparticles can be ordered into an $L1_0$ structure and obtain perpendicular orientation.

The CoPt nanoparticles used in the second contact step can be also produced according to any conventionally known method. In a specific example of the method of manufacturing method CoPt nanoparticles, first, a mixed solution of a Pt compound and a reducing agent is reacted to generate particles of a metal Pt core in the solution by reduction reaction of the Pt compound. Examples of the Pt compound used at this time include Pt acetylacetonate and Pt ethoxide ($Pt(OEt)_2$). Examples of the reducing agent include unsaturated hydrocarbon of 16 to 18 carbon atoms such as 1-octadecene (preferably linear unsaturated hydrocarbon, and preferably unsaturated hydrocarbon having a double bond at one end) and saturated hydrocarbon diol of 16 to 18 carbon atoms such as 1,2-hexadecane diol (preferably hydrocarbon diol in which a saturated hydrocarbon group is a linear group, and preferably hydrocarbon diol having a hydroxyl group at the 1- and 2-positions). During this reduction reaction, it is preferable to add a dispersant for uniformly dispersing the Pt nuclear particles to the mixed solution, and examples of the dispersant include linear unsaturated fatty acids of 3 to 17 carbon atoms such as oleic acid and N-2-vinylpyrrolidone.

Next, a Co compound is added to the solution in which the particles of a metal Pt core are dispersed, and then metal Co is deposited from the above solution on the surface of the particles of a metal Pt core. Examples of the Co compound used at this time include cobalt acetylacetate, cobalt octacarbonyl and the like.

Next, nanoparticles obtained by the above processing are heated in a reaction solution to about 200° C. to 300° C. Thereby, CoPt nanoparticles in which Co atoms and Pt atoms are interdiffused are formed. After that, by separating the CoPt nanoparticles from the solution and performing wet classification in separation, CoPt nanoparticles having more uniform particle diameter can be obtained.

It is preferable that the average particle diameter of the CoPt nanoparticles be set to fall within a range of 3 to 5 nm. Thereby, the CoPt nanoparticles can be uniformly arranged on the surface of the non-magnetic substrate subjected to the texturing treatment in the circumferential direction. The average particle diameter of the CoPt nanoparticles can be calculated based on an image of Transmission Electron Microscope (TEM).

By dispersing the CoPt nanoparticles on the surface of the substrate, and then performing thermal treatment in an inert gas atmosphere, such as argon gas, at 500° C. for 30 minutes while perpendicularly applying an external magnetic field to the surface of the substrate, the CoPt nanoparticles can be ordered into an $L1_0$ or $L1_1$ structure and obtain perpendicular orientation.

The forming method of the FePt or CoPt nanoparticle array 5A is not limited to the above-mentioned method. For example, by applying the dispersion of the FePt or CoPt nanoparticles 5 dispersed by the dispersant to the formation surface 2a of the non-magnetic substrate 2 subjected to texture treatment, the nanoparticle array 5A in which the plurality of nanoparticles 5 can be formed.

Following formation of the FePt or CoPt nanoparticle array 5A on the non-magnetic substrate 2, by imparting perpendicular magnetic anisotropy to the nanoparticle array 5A, the perpendicular magnetic layer 4 is obtained.

Specifically, the FePt or CoPt nanoparticle array 5A is thermally treated in an inert gas atmosphere, such as argon gas, at 500 to 900° C. for 30 minutes while perpendicularly applying an external magnetic field. Thereby, the easy axes of the FePt or CoPt nanoparticles 5 are oriented in the perpendicular direction as the applying direction of the external magnetic field to impart perpendicular orientation.

Figure 2E:
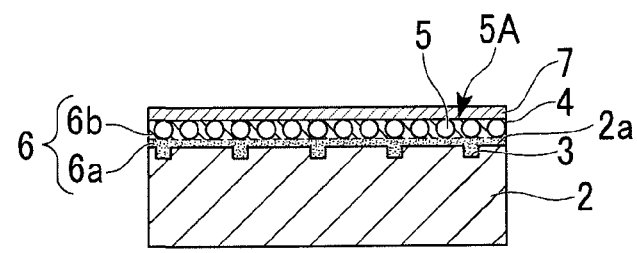
FIG. 2E is a sectional view illustrating one step of the manufacturing process in the magnetic recording medium shown in FIG. 1.

Next, as shown in FIG. 2E, the protective layer 7 is formed on the perpendicular magnetic layer 4. The protective layer 7 serves to prevent corrosion of the perpendicular magnetic layer 4 and damage of the medium surface when a magnetic head comes into contact with the medium, and conventionally known materials containing, for example, C, $SiO_2$, $ZrO_2$ can be used as a material for the protective layer 7. It is preferable that the thickness of the protective layer 7 fall within a range of 1 to 5 nm in terms of high recording density, which makes a distance between the magnetic head and the medium surface small.

Figure 2F:
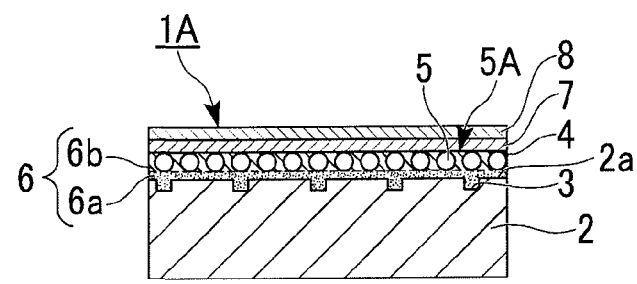
FIG. 2F is a sectional view illustrating one step of the manufacturing process in the magnetic recording medium shown in FIG. 1.

Next, as shown in FIG. 2F, the lubricant layer 8 is formed by applying a lubricant agent on the protective layer 7. This lubricant layer 8 can be made of any conventionally known material such as perfluoropolyether, fluorinated alcohol and fluorinated carboxylic acid, and normally has a thickness of 1 to 4 nm.

Through the above-mentioned steps, the magnetic recording medium 1A shown in FIG. 1A and FIG. 2B can be manufactured.

As described above, according to the present invention, by applying a texturing treatment to the surface (formation surface) 2a of the non-magnetic substrate 2, the plurality of striations 3 each having a circumferential directional component are formed. Thereby, a defect, flaw and so on of the substrate surface, which cause local disturbance of the FePt or CoPt nanoparticles 5, can be hidden, resulting in the FePt or CoPt nanoparticles 5 being uniformly arranged on the surface 2a of the non-magnetic substrate 2.

Accordingly, according to the present invention, it is possible to manufacture the magnetic recording medium 1A in which the FePt or CoPt nanoparticles 5 having a uniform shape, uniform particle diameter and uniform magnetic properties are uniformly arranged on the surface 2a of the non-magnetic substrate 2 such that their easy axes are perpendicularly oriented.

[Second Embodiment]
(Magnetic Recording Medium)

Figure 3A:
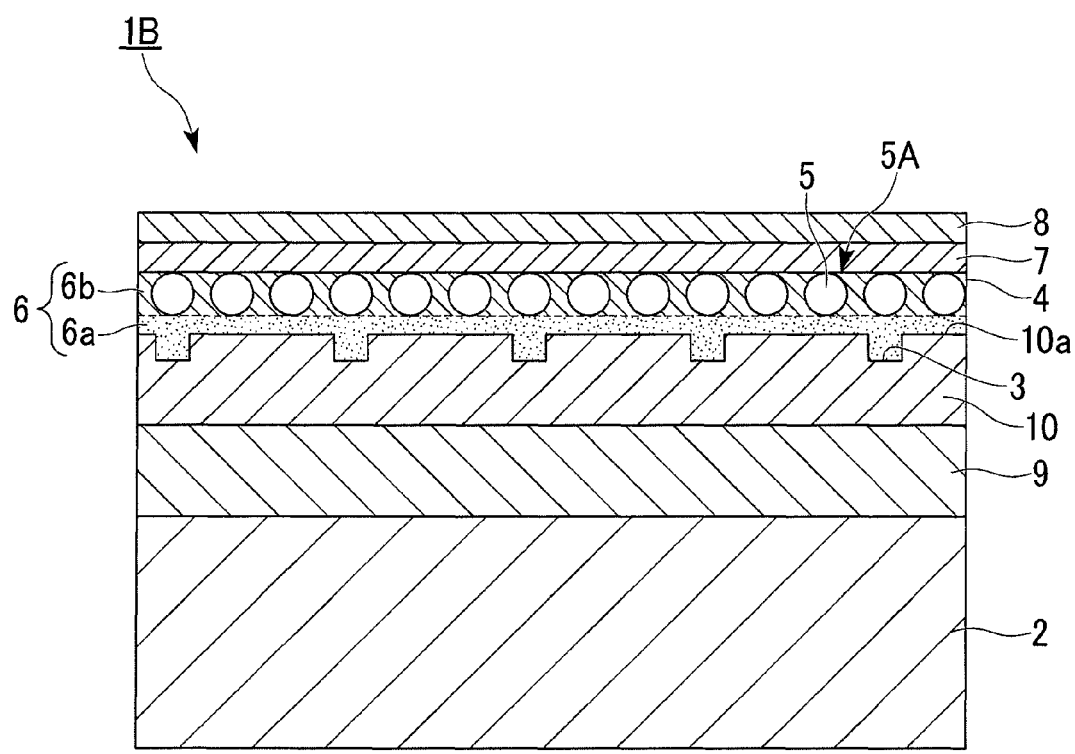
FIG. 3A is a sectional view showing a structure of a magnetic recording medium in the second embodiment.
Figure 3B:
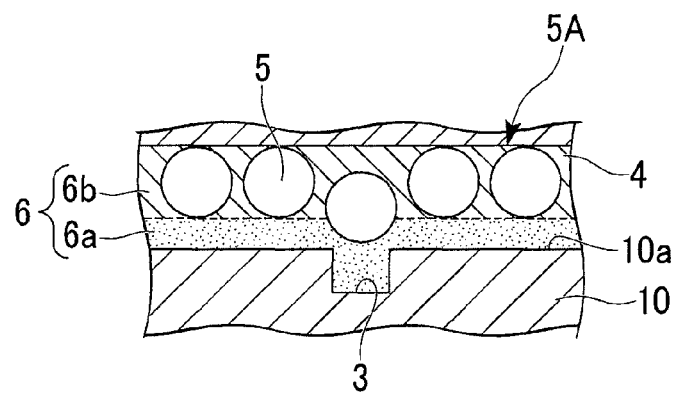
FIG. 3B is an enlarged sectional view of a main part of the magnetic recording medium in the second embodiment.

First, a magnetic recording medium 1B in the second embodiment of the present invention as shown in FIG. 3A and FIG. 3B will be described.

FIG. 3A is a sectional view showing a structure of the magnetic recording medium 1B, and FIG. 3B is an enlarged sectional view showing a main part of the magnetic recording medium 1B. In the following description, the same components as those in the magnetic recording medium 1A are given the same reference numerals in the drawings and description thereof is omitted.

As shown in FIG. 3A and FIG. 3B, the magnetic recording medium 1B includes an underlayer 9 and an intermediate layer 10 in this order between the non-magnetic substrate 2 and the perpendicular magnetic layer 4, and further has the formation surface 10a in which the plurality of striations 3 each having a circumferential directional component are formed by applying a texturing treatment to a surface 10a of the intermediate layer 10 in place of applying a texturing treatment to the surface of the non-magnetic substrate 2. The FePt or CoPt nanoparticle array 5A that serves as the perpendicular magnetic layer 4 is formed on the formation surface 10a. The magnetic recording medium 1B has the same structure as that of the magnetic recording medium 1A shown in FIG. 1A and FIG. 1B except for the above-mentioned constituents.

In the magnetic recording medium 1A having the above-mentioned structure, local disturbance of the nanoparticles 5 on the formation surface 10a can be prevented by applying a texturing treatment to the surface (formation surface) 10a of the intermediate layer 10 in the circumferential direction to provide the minute striations 3. Therefore, according to the present invention, it is possible to obtain the magnetic recording medium 1B having the perpendicular magnetic layer 4 formed of the nanoparticle array 5A in which the FePt or CoPt nanoparticles 5 having a uniform shape, uniform particle diameter and uniform magnetic properties are uniformly arranged on the formation surface 10a such that their easy axes are perpendicularly oriented.

(Method of Manufacturing Magnetic Recording Medium)

Next, a method of manufacturing a magnetic recording medium 1B shown in FIG. 3A and FIG. 3B will be described with reference to FIG. 4A to FIG. 4H.

In manufacturing the magnetic recording medium 1B, first, as shown in FIG. 4A, the disk-shaped non-magnetic substrate 2 having the central hole is prepared.

Next, as shown in FIG. 4B, the underlayer 9 is formed on the non-magnetic substrate 2. The underlayer 9 can be made from, for example, a soft magnetic material such as a CoFe alloy. By making the underlayer 9 from the CoFe alloy, a high saturation flux density Bs (1.4 [T] or more) and excellent recording/reproduction characteristics can be obtained. It is preferable that the content of Fe in the CoFe alloy fall within a range of 5 to 60 atomic %. When the content of Fe is less than 5 atomic %, the saturation flux density Bs of the soft magnetic material lowers. On the contrary, when the content of Fe exceeds 60 atomic %, corrosiveness of the soft magnetic material deteriorates, which is undesirable.

The thickness of the underlayer 9 preferably falls within a range of 20 to 80 nm. When the thickness of the underlayer 9 is less than 20 nm, the magnetic flux from the magnetic head cannot be sufficiently absorbed, resulting in writing becoming insufficient and recording/reproduction characteristic deteriorating. On the contrary, when the thickness of the underlayer 9 exceeds 80 nm, productivity greatly lowers, which is undesirable.

It is preferable that the underlayer 9 have a structure in which a first soft magnetic layer, an Ru layer and a second soft magnetic layer are stacked in this order. That is, since the Ru layer is sandwiched between the two soft magnetic layers, the underlayer 9 has a structure in which the soft magnetic layers on and under the Ru layer are antiferromagnetically coupled (AFC) to each other. Thereby, it is possible to increase resistance to the external magnetic field and wide area tack erasure (WATE) phenomenon as a problem unique to perpendicular magnetic recording.

In the magnetic recording medium 1B, the underlayer (soft magnetic layer) 9 for returning the magnetic field to the magnetic head in writing to the perpendicular magnetic layer (perpendicular magnetic recording layer) 4 by the magnetic head needs to be provided below the perpendicular magnetic layer 4. However, when the soft magnetic layer 9 is provided directly on the surface of the non-magnetic substrate 2, corrosion of the soft magnetic layer 9 can proceed due to an absorption gas on the surface of the non-magnetic substrate 2, the effect of moisture and diffusion of substrate components. Thus, it is preferable to provide an adhesive layer (not shown) between the non-magnetic substrate 2 and the soft magnetic layer 9. The adhesive layer can be appropriately selected from, for example, Cr, Cr alloy, Ti, Ti alloy. The thickness of the adhesive layer is preferably 2 nm or more.

Next, as shown in FIG. 4C, the intermediate layer 10 is formed on the underlayer 9. The intermediate layer 10 is a layer for allowing the perpendicular magnetic layer 4 to have c-axis oriented column crystal, and may be made of Ru or Ru alloy, for example. Examples of Ru alloy include RuCo, RuAl, RuMn, RuMo and RuFe alloys. The amount of Ru in Ru alloy preferably falls within a range of 50 atomic % to 90 atomic %.

The thickness of the intermediate layer 10 is preferably 30 nm or less, and more preferably, 16 nm or less. By reducing the thickness of the intermediate layer 10, a distance between the magnetic head and the underlayer (soft magnetic layer) 9 becomes small and thus, a magnetic flux from the magnetic head can be made sharp. As a result, the thickness of the soft magnetic layer 9 can be further reduced, thereby improving productivity.

Next, as shown in FIG. 4D, by applying a texturing treatment to the surface (formation surface) 10a of the intermediate layer 10, the plurality of striations 3 each having a circumferential directional component are formed (this process is referred to as texture method).

In the texturing treatment, the plurality of striations 3 are formed on the surface 10a of the intermediate layer 10 by pressing the texturing tape onto the surface 10a of the intermediate layer 10 of the non-magnetic substrate 2 rotated at low speed while dripping a polishing solution containing diamond abrasive particles or alumina abrasive particles.

Examples of the polishing solution include an aqueous diamond slurry. Examples of the texturing tape include polyester ultrafine fiber cloth. The number of rotations of the non-magnetic substrate 2 varies depending on its diameter and for example, in manufacturing the magnetic recording medium having a diameter of 1.89 to 3.5 inches, the number of rotations of the non-magnetic substrate 2 may be set to fall within a range of 150 to 800 rpm. When the number of rotations of the non-magnetic substrate 2 exceeds the range, the surface 10a of the intermediate layer 10 can become rough, and when the number of rotations of the non-magnetic substrate 2 falls below the range, processing time is prolonged, which is undesirable.

The center line average surface roughness (Ra) of the non-magnetic substrate 10 subjected to texture treatment falls within, preferably, a range of 0.15 to 1 nm (1.5 to 10 Å) and more preferably, a range of 0.2 to 0.5 nm (2.0 to 5 Å). When the surface roughness Ra of the intermediate layer 10 becomes less than 0.15 nm (1.5 Å), the effect of the striations 3 subjected to the texturing treatment becomes insufficient, that is, the effect of uniformly arranging the FePt or CoPt nanoparticles as mentioned below becomes insufficient. On the other hand, when the surface roughness Ra of the intermediate layer 10 exceeds 1 nm (10 Å), the surface roughness of the final magnetic recording medium 1B deteriorates and thus, a floating amount of a magnetic head cannot be made sufficiently small, which is undesirable.

In the surface 10a of the non-magnetic substrate 10 subjected to texture treatment, preferably, the distance between the adjacent striations 3 is set to fall within a range of 10 to 20 nm. Since the average particle diameter of the FePt or CoPt nanoparticles is 3 to 5 nm, by setting the distance between the adjacent striations 3 to be in this range, the FePt or CoPt nanoparticles can be uniformly arranged on the surface 10a of the intermediate layer 10.

The distance between the adjacent striations 3 formed on the surface 10a of the intermediate layer 10 depends on the material, particle diameter, concentration and amount of the abrasive particles contained in the polishing solution, the material for the texturing tape, fiber density, pressing load and the number of rotations of the substrate. Thus, the distance between the adjacent striations 3 formed on the surface 10a of the intermediate layer 10 can be adjusted by appropriately selecting these conditions. The surface roughness (Ra) of the intermediate layer 10 and the distance between the adjacent striations 3 can be measured by use of the AFM.

Next, by bringing the dispersion of the FePt or CoPt nanoparticles 5 into contact with the surface 10a of the non-magnetic substrate 10 subjected to texture treatment, the FePt or CoPt nanoparticle array 5A that serves as the perpendicular magnetic layer 4 is formed.

Specifically, first, as shown in FIG. 4E, a solution of the dispersant 6a having the first functional group is brought into contact with the surface 10a of the non-magnetic substrate 10 subjected to texture treatment (this step is referred to as a first contact step).

In the first contact step, it is preferable that an organic substance having the first functional group that is likely to bond with a below-mentioned second functional group and is less likely to bond with the surface 10a of the intermediate layer 10 at one end of its molecular chain, and a third functional group that is likely to bond with the surface 10a of the intermediate layer 10 and is less likely to bond with the second functional group at the other end of its molecular chain be used as the dispersant 6a having the first functional group. Thereby, molecules of the dispersant are chemically bonded to the surface 10a of the intermediate layer 10 through the third functional group to form a monomolecular film of the dispersant 6a having the first functional group on the surface of the intermediate layer 10.

Among the first and third functional groups having such characteristics, examples of the first functional group include a thiol group and an amino group, and examples of the third functional group include a methoxysilanyl group, an alkoxysilanyl group such as an ethoxysilanyl group, a silanol group and a hydroxyl group, and they can be appropriately selected and used. Examples of the dispersant 6a having the first and third functional groups include 3-mercaptotriethoxysilane.

The solution of the dispersant 6a can be brought into contact with the surface 10a of the intermediate layer 10 according to any conventionally known method. For example, a method of dissolving the dispersant 6a in a solvent such as toluene, immersing the non-magnetic substrate 2 into the solution and heating the solution at 50 to 70° C. for 1 to 20 minutes can be adopted. Alternatively, a method of applying the solution onto the intermediate layer 10 by spin coating or the like and holding them for the same time as the immersion time can be adopted.

Next, as shown in FIG. 4F, a dispersion of the FePt or CoPt nanoparticles 5 coated with the dispersant 6b having the second functional group is brought into contact with the surface 10a of the intermediate layer 10 in contact with the dispersant 6a having the first functional group (this step is referred to as a second contact step).

In the second contact step, by bringing the dispersion of the FePt or CoPt nanoparticles 5 coated with the dispersant 6b having the second functional group into contact with the surface 10a of the intermediate layer 10, on which the monomolecular film of the dispersant 6a having the first functional group, the first functional group and the second functional group are chemically bonded to each other. Thereby, the FePt or CoPt magnetic nanoparticle array 5A in which the plurality of FePt or CoPt nanoparticles 5 are uniformly arranged can be formed on the formation surface 10a of the intermediate layer 10 subjected to the texturing treatment.

It is preferable that an organic substance having the second functional group that is likely to bond with the first functional group and is less likely to bond with the FePt or CoPt nanoparticles 5 at one end of its molecular chain, and the fourth functional group that is less likely to bond with the first functional group and is likely to bond with the FePt or CoPt nanoparticles 5 at the other end of its molecular chain be used as the dispersant 6b used in the second contact step. Thereby, molecules of the coating agent are chemically bonded to the surface of the nanoparticles 5 through the fourth functional group to form a monomolecular film of the dispersant 6b on the surface of the nanoparticles 5 and to coat the surface with the second functional group.

Among the second and fourth functional groups having such characteristics, examples of the second functional group include a thiol group, and examples of the fourth functional group include a thiol group, an amino group and a cyano group. They can be appropriately selected and used.

Examples of the dispersant 6b using the second functional group and the fourth functional group include 1,6-hexanedithiol, 1,9-nonanedithiol and 1,10-decanedithiol.

The FePt or CoPt nanoparticles 5 can be coated with the dispersant 6b having the second functional group according to any conventionally known method. For example, a method of dissolving the dispersant 6b in a solvent such as toluene, hexane or the like and immersing the FePt or CoPt nanoparticles 5 in the solvent at 20 to 60° C. for 1 to 20 minutes can be adopted.

The dispersion of the FePt or CoPt nanoparticles 5 coated with the dispersant 6b having the second functional group can be brought into contact with the surface 10a of the intermediate layer 10 according to any conventionally known method. For example, a method of immersing the non-magnetic substrate 2 into the dispersion or a method of applying the dispersion to the surface 10a of the intermediate layer 10 by spin coating or the like can be adopted.

The forming method of the FePt or CoPt nanoparticle array 5A is not limited to the above-mentioned method. For example, by applying the dispersion of the FePt or CoPt nanoparticles 5 dispersed by the dispersant to the formation surface 10a of the non-magnetic substrate 10 subjected to texture treatment, the nanoparticle array 5A in which the plurality of nanoparticles 5 are dispersed can be formed.

Following formation of the FePt or CoPt nanoparticle array 5A on the intermediate layer 10, by imparting perpendicular magnetic anisotropy to the nanoparticle array 5A, the perpendicular magnetic layer 4 is obtained. Specifically, the FePt or CoPt nanoparticle array 5A is thermally treated in an inert gas atmosphere, such as argon gas, at 500° C. for 30 minutes while perpendicularly applying an external magnetic field. Thereby, the easy axes of the FePt or CoPt nanoparticles 5 are oriented in the perpendicular direction as the applying direction of the external magnetic field to impart perpendicular orientation.

Next, as shown in FIG. 4G, by forming the protective layer 7 on the perpendicular magnetic layer 4, and then applying a lubricant agent to the protective layer 7 as shown in FIG. 4H, the lubricant layer 8 is formed.

Through the above-mentioned steps, the magnetic recording medium 1B shown in FIG. 3A and FIG. 3B can be manufactured.

As described above, according to the present invention, by applying a texturing treatment to the surface (formation surface) 10a of the intermediate layer 10, the plurality of striations 3 each having a circumferential directional component is formed. Thereby, a defect, flaw and so on of the substrate surface, which cause local disturbance of the FePt or CoPt nanoparticles 5, can be hidden, resulting in the FePt or CoPt nanoparticles 5 being uniformly arranged on the surface 10a of the intermediate layer 10.

Therefore, according to the present invention, it is possible to manufacture the magnetic recording medium 1B in which the FePt or CoPt nanoparticles 5 having a uniform shape, uniform particle diameter and uniform magnetic properties are uniformly arranged on the surface 10a of the intermediate layer 10 such that their easy axes are vertically oriented.

(Magnetic Record/Reproduction Apparatus)

Figure 5:
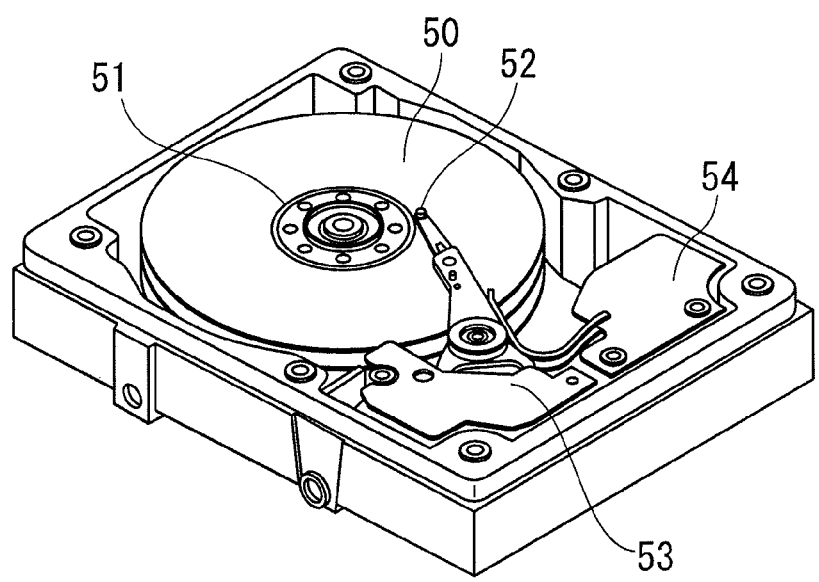
FIG. 5 is a perspective view showing one example of a magnetic record/reproduction apparatus according to the present invention.

FIG. 5 shows an example of a magnetic record/reproduction apparatus according to the present invention.

The magnetic record/reproduction apparatus includes a perpendicular magnetic recording medium 50, a medium driving unit 51 that rotationally drives the perpendicular magnetic recording medium 50, a magnetic head 52 that records/reproduces information on/from the perpendicular magnetic recording medium 50, a head driving unit 53 that drives the magnetic head 52 relative to the perpendicular magnetic recording medium 50 and a recording/reproduction signal processing system 54. The recording/reproduction signal processing system 54 can process data inputted from the outside and send a record signal to the magnetic head 52, and process a reproduction signal from the magnetic head 52 and send data to the outside.

In the magnetic record/reproduction apparatus, in order to satisfy requirement to increase the recording density of the perpendicular magnetic recording medium, a magnetic monopole head having an excellent writing capability to the perpendicular magnetic recording medium 50 is used as the magnetic head 52. In the magnetic record/reproduction apparatus, the magnetic head 52 having a GMR element utilizing the giant magnetic resistance (GMR) effect as a reproduction element, which is suited to high recording density, can be used.

The magnetic record/reproduction apparatus according to the present invention uses the magnetic recording medium 1B shown in FIG. 3A and FIG. 3B as the perpendicular magnetic recording medium 50. In the perpendicular magnetic recording medium 50, in order to support such magnetic monopole head, the underlayer (soft magnetic layer) 9 is provided between the non-magnetic substrate 2 and the perpendicular magnetic layer 4, thereby improving the efficiency of access of a magnetic flux between the magnetic monopole head and the perpendicular magnetic recording layer 4.

EXAMPLES

The effects of the present invention will be made more apparent by way of Examples. However, the present invention is not limited to the following Examples and may be appropriately modified and implemented without changing the gist.

<Manufacture of FePt Nanoparticles>

In this example, first, a solution containing Pt acetylacetonate $(Pt(acac)_2)$ of 0.5 mmol/dm$^3$ as a Pt compound, 1-octadecene of 1.5 mmol/dm$^3$ as the reducing agent, oleic acid of 0.94 mmol/dm$^3$ as a first particle dispersant and benzyl ether as a solvent was prepared. Then, this solution was heated in a flask in an argon atmosphere to 100° C. At 100° C., iron pentacarbonyl $(Fe(CO)_5)$ of 0.99 mmol/dm$^3$ as an Fe compound was added, and the temperature was further increased to 120° C. and maintained for 5 minutes. When iron pentacarbonyl was dissolved, oleylamine of 1.4 mmol/dm$^3$ as a second particle dispersant was added. Then, this solution was heated to 245° C., aged at this temperature for 120 minutes, and then cooled to a room temperature to obtain FePt nanoparticles. Then, by removing excessive precursors and by-products by centrifugation, and then dispersing the FePt nanoparticles in hexane, a dispersion of the FePt nanoparticles, the surfaces of which were coated with the dispersant, was obtained.

Further, by dispersing the FePt nanoparticles in 1,6-hexanedithiol and immersing the FePt nanoparticles therein at 40° C. for 10 minutes, surfaces of the FePt nanoparticles were coated with a monomolecular film of molecules of the dispersant. After that, by dispersing this in hexane, a dispersion of the FePt nanoparticles coated with the monomolecular film of the dispersant molecules.

<Manufacture of Magnetic Recording Medium>

Next, a silicon substrate (2.5 inches in diameter) as a non-magnetic substrate was prepared and washed. The washed silicon substrate was installed in a vacuum chamber, and air was evacuated from the vacuum chamber so as to be $1.0 \times 10^{-5}$ Pa or less. The used silicon substrate had an outer diameter of 65 mm, an inner diameter of 20 mm and an average surface roughness (Ra) of 0.2 nm.

Then, an FeCoB thin film of 60 nm as the underlayer (soft magnetic layer) and an Ru thin film of 10 nm as the intermediate layer (non-magnetic layer) were stacked on the silicon substrate by DC sputtering, and then texturing treatment was applied to the substrate in the circumferential direction. The texturing treatment used aqueous diamond slurry containing diamond abrasive particles having an average particle diameter of 0.1 μm as the polishing solution, polyester ultrafine fiber cloth as the texturing tape and the number of rotations of the substrate of 550 rpm. When examining the substrate surface after texturing treatment by use of the AFM, Ra was 0.3 nm and a distance between adjacent striations was 13 nm.

Next, by applying diluted 3-mercaptotriethoxysilane to the substrate surface by spin coating, and then heating the substrate at 100° C. for 8 minutes, a monomolecular film having the first functional group was formed on the substrate surface.

Next, the dispersion of the FePt nanoparticles coated with the dispersant having the second functional group was applied to the surface of the non-magnetic substrate, on which the monomolecular film having the first functional group was formed, by spin coating, and then the substrate was dried. After that, by heating the treated substrate in an inert gas atmosphere, such as argon gas, at 700° C. for 30 minutes while perpendicularly applying the external magnetic field, perpendicular magnetic orientation was imparted to the FePt nanoparticles array.

After that, in order to form a protective film of the magnetic recording medium, a carbon film of 4 nm was formed on the substrate by sputtering and a lubricant agent film was formed thereon by dipping.

<Evaluation>

When evaluating the magnetic recording medium thus manufactured, it was confirmed that smoothness of the surface was high and magnetic recording/reproduction could be performed.

According to the present invention, it is possible to provide a magnetic recording medium in which FePt or CoPt nanoparticles having a uniform shape, uniform particle diameter and uniform magnetic properties are uniformly arranged on the surface of the non-magnetic substrate such that their easy axes are perpendicularly oriented, and a manufacturing method thereof. Further, it is possible to provide a magnetic record/reproduction apparatus including the magnetic recording medium or a magnetic recording medium manufactured according to the manufacturing method, which is industrially applicable.

REFERENCE SIGNS LIST 1A, 1B: Magnetic recording medium
2: Non-magnetic substrate
2a: Formation surface
3: Striation
4: Perpendicular magnetic layer
5: FePt or CoPt nanoparticle
5A: FePt or CoPt nanoparticle array
6: Coating layer
6a: Coating agent having first functional group
6b: Coating agent having second functional group
7: Protective layer
8: Lubricant layer
9: Underlayer (Soft magnetic underlayer)
10: Intermediate layer
10a: Formation surface

What is claimed is:

1. A method of manufacturing a magnetic recording medium comprising a disk-shaped non-magnetic substrate and at least a perpendicular magnetic layer formed on the disk-shaped non-magnetic substrate, the method comprising the steps of:
   applying a texturing treatment to a formation surface, on which the perpendicular magnetic layer is formed, to form a plurality of striations each having a circumferential directional component on the formation surface, said texturing treatment is performed by pressing a texturing tape onto the surface of the non-magnetic substrate while dripping a polishing solution;
   bringing a dispersion of FePt or CoPt nanoparticles dispersed by a dispersant into contact with an entire surface of the formation surface subjected to the texturing treatment to form an FePt or CoPt nanoparticle array that serves as the perpendicular magnetic layer on the formation surface, wherein a surface roughness of the non-magnetic substrate subjected to the texturing treatment is set to fall within a range of 0.15 to 1 nm in center line average roughness (Ra) and a distance between the adjacent striations is set to fall within a range of 10 to 20 nm, and
   sequentially stacking a soft magnetic underlayer and an intermediate layer that serves as the formation surface between the non-magnetic subtrate and the perpendicular magnetic layer
   wherein said texturing treatment is applied to a surface of the intermediate layer after a sputtering treatment.

2. The method of manufacturing a magnetic recording medium according to claim 1, wherein the texturing treatment is applied to a surface of the non-magnetic substrate that serves as the formation surface.

3. The method of manufacturing a magnetic recording medium according to claim 1, wherein an average particle diameter of the FePt or CoPt nanoparticles falls within a range of 3 to 5 nm.

4. A magnetic record/reproduction apparatus comprising:
   the magnetic recording medium according to claim 1;
   a medium driving unit that drives the magnetic recording medium in a recording direction;
   a magnetic head that performs a recording operation and a reproduction operation relative to the magnetic recording medium;
   head moving means configured to move the magnetic head relative to the magnetic recording medium; and
   a recording/reproduction signal processing means configured to input a signal to the magnetic head and reproduce an output signal from the magnetic head.

5. A magnetic record/reproduction apparatus comprising:
   the magnetic recording medium manufactured by the manufacturing method according to claim 1;
   a medium driving unit that drives the magnetic recording medium in a recording direction;
   a magnetic head that performs a recording operation and a reproduction operation relative to the magnetic recording medium;
   head moving means configured to move the magnetic head relative to the magnetic recording medium; and
   a recording/reproduction signal processing means configured to input a signal to the magnetic head and reproduce an output signal from the magnetic head.

6. The method of manufacturing a magnetic recording medium according to claim 1, wherein the polishing solution contains diamond abrasive particles or alumina abrasive particles.

* * * * *